Figure 1:
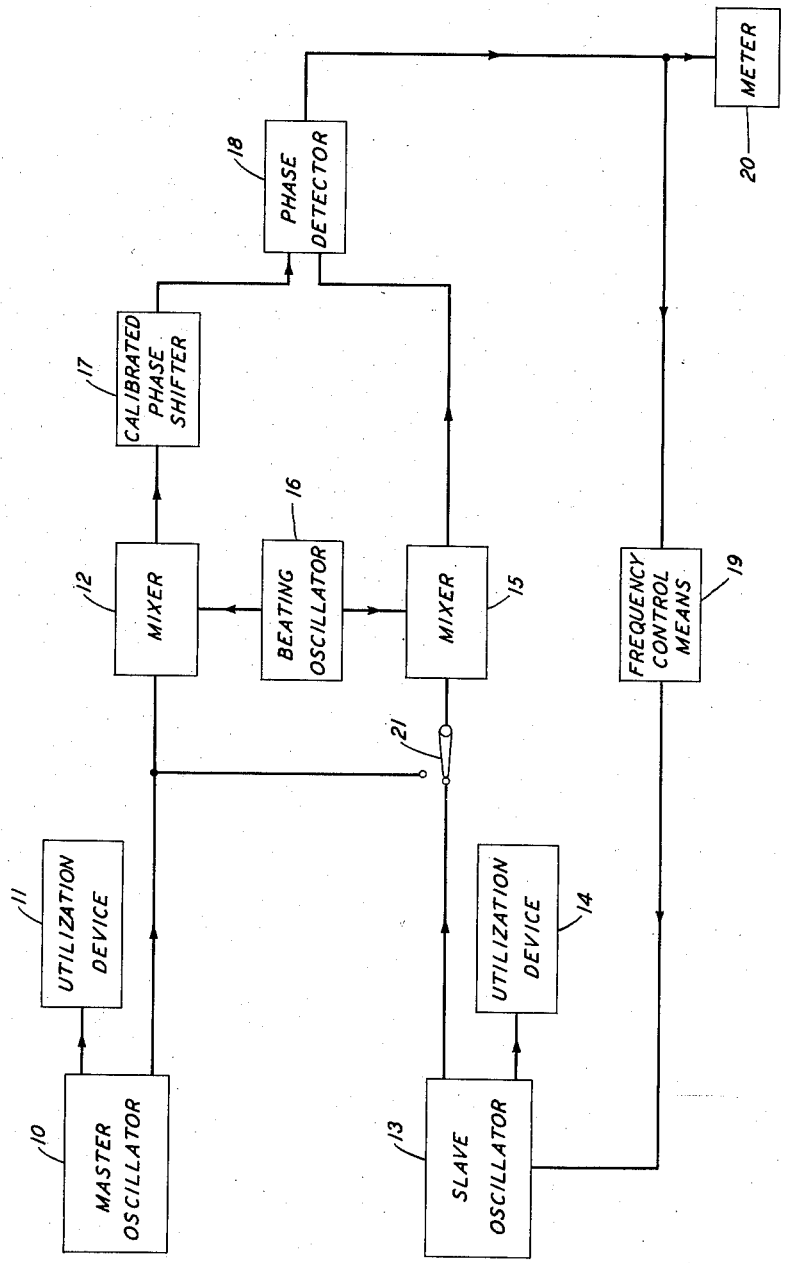

INVENTOR
L. HOWSON
BY
Franklin Mohr
ATTORNEY

United States Patent Office 2,851,658
Patented Sept. 9, 1958

2,851,658

PHASE SHIFTING CIRCUIT

Louis Howson, Bloomfield, N. J., assignor to Bell Telephone Laboratories, Incorporated, New York, N. Y., a corporation of New York Application September 1, 1953, Serial No. 377,808

2 Claims. (Cl. 324—57)

This invention relates to phase shifters and more particularly to an arrangement whereby a phase shifter that is highly accurate at a single, relatively low frequency at which it is designed to work may be used to determine with high precision a phase shift or phase difference between two waves of relatively high frequency.

An object of the invention is to introduce frequency translation into a phase shifting circuit in such a manner that the precision of phase determination is substantially the same after the frequency translation as before.

Another object is to stabilize a phase shifting circuit.

A feature of the invention is that where mixers are employed to effect the frequency translation, the mixers are so placed in the circuit that they may be operated under substantially constant and especially favorable conditions whereby phase errors caused by the mixers are minimized.

In accordance with one embodiment of the invention, a phase shift introduced by a calibrated phase shifter operating at a relatively low frequency is offset by a phase difference automatically set up between two relatively high frequency sources. A phase detector operating at the lower frequency determines when the offsetting of the phases is complete and generates a corrective potential whenever a phase error is present. The corrective potential is utilized to operate a frequency control upon one of the high frequency sources. This embodiment makes available two high frequency waves of the same frequency with an accurately maintained constant phase difference between them. The high frequency waves may be impressed upon any desired utilization devices. Up to 360 degrees of continuously variable phase shift may be introduced over a frequency range that extends from kilocycles to kilomegacycles with equipment now available.

In accordance with another embodiment of the invention a pair of wave sources, maintained at a controllable phase difference as in the first mentioned embodiment, are impressed respectively upon a reference transmission path and upon a transmission path the relative phase shift of which is to be measured. A second phase detector is provided in which the phase of the waves at the output of the respective transmission paths may be compared. The controllable phase shift may be adjusted until the difference in phase shift in the two paths is precisely equal to the phase difference between the two sources.

Figure 2:
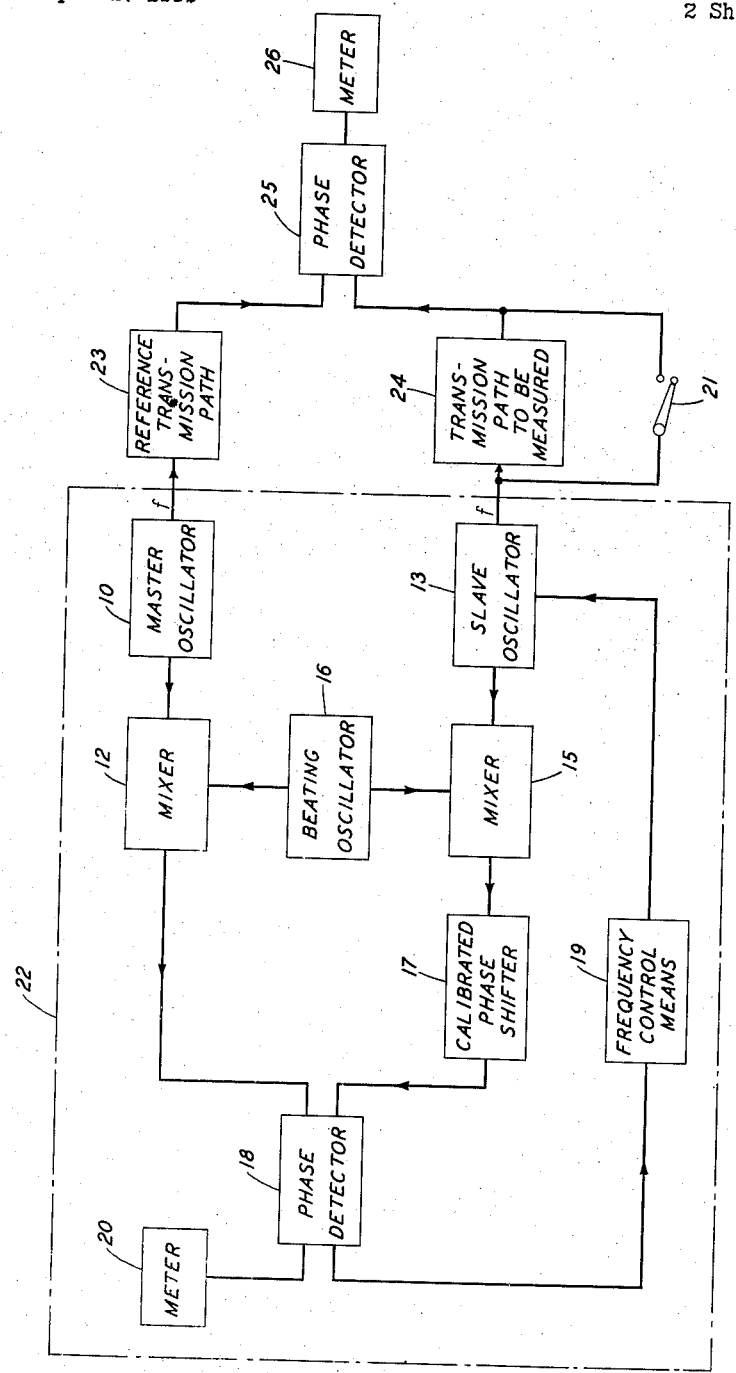

In the drawings:

Fig. 1 is a block schematic diagram of an embodiment of the invention in a system for providing two waves differing by an accurately determined phase angle; and Fig. 2 is a block schematic diagram of an embodiment of the invention in a phase measuring system.

The embodiments described herein are of the heterodyne type. Basic to heterodyne phase measuring or translating devices is the well known trigonometric equation, which in terms of a phase angle $\theta$ may be written:

$$\cos pt \cos (qt+\theta) = \frac{1}{2} \cos [(p+q)t+\theta + \frac{1}{2} \cos (p-q)t-\theta] \quad (1)$$

where $p$ and $q$ are any two frequencies each multiplied by $2\pi$. Equation 1 shows that the modulation (mixing) process translates a phase angle $\theta$ at the frequency $q/2\pi$ to the identical phase angle (in degrees or other angular measure) at the frequency $(p+q)/2\pi$. Thus a frequency step-up is obtained preserving the original phase angle. Another frequency shift is also available from the frequency $q/2\pi$ to $(p-q)/2\pi$ but with a reversal in sign of the phase angle $\theta$.

In the present state of the art, no special problem exists in measuring or producing phase shifts at low frequencies, but it is advantageous to build phase shifters at low frequencies and be able to use them in producing and measuring phase shifts at higher frequencies.

Fig. 1 shows an embodiment of the invention in which master and slave oscillators are automatically maintained in synchronous operation with a desired constant phase difference between them. The master oscillator 10 may be connected to any desired utilization device 11 and is also connected to a mixer 12. The slave oscillator 13 may be connected to the same or any other desired utilization device, shown in the figure as a separate device 14. The slave oscillator is also connected to a mixer 15. A beating oscillator 16 is connected to both of the mixers. A calibrated phase shifter 17 of any known suitable type is connected to the output of one of the mixers, 12 as shown. The output of the phase shifter together with the output of the other mixer, 15 as shown, is connected to a phase detector 18 the output of which is connected to a frequency control means 19 which latter controls the frequency of the slave oscillator 13. A meter 20 may be provided in the output circuit of the phase detector to indicate phase errors.

The beat frequency supplied by the oscillator 16 is adjusted to differ from the frequency of the master oscillator by any desired frequency interval, which may be designated $\Delta$. The useful output of each mixer is this difference frequency $\Delta$. Any phase difference between the mixer inputs is superimposed on the $\Delta$ frequency mixer outputs. The outputs from the mixer 15 provides one of the inputs to the phase detector 18. The output from the mixer 12, after passing through the phase shifter 17, provides the second input to the phase detector. The phase detector may be of the conventional sum and difference type wherein if the inputs are in phase quadrature, the detector output is zero. Alternatively, a detector may be used that gives a null output when the phases are alike.

The frequency control means 19 makes use of the phase detector 18 to sense any departure from the phase quadrature or other standard phase condition and to develop a corrective response that acts upon the slave oscillator 13 to alter the frequency of the latter. It is arranged that the direction of the frequency correction is such as to tend to restore the standard phase relationship in the phase detector. The result of the frequency control action is to maintain the slave oscillator frequency at precisely the value of the master oscillator frequency. Any frequency difference which may occur between the master and slave oscillators appears as a phase change in the detector and is corrected until the frequency difference is removed.

In the operation of the system of Fig. 1 as a phase shifter, a reference condition (zero condition) is first established. To do this, a switch 21 may be provided, by means of which in the upper position of the switch the slave oscillator is disconnected from the mixer 15 and the master oscillator connected to both mixers. The calibrated phase shifter 17 is then adjusted so that the output of the phase detector is null. This procedure establishes a condition of zero phase detector output, signals of like phase being applied to the two mixers.

The reference condition having been established, the switch 21 may be placed in the lower position, thereby connecting the master and slave oscillators respectively to the mixers 12 and 15. There now occurs an automatic adjustment in the frequency control means governing the slave oscillator which synchronizes the frequencies of the two oscillators, if, as usual, the two are not already in synchronism at the start. Now, if an operating point adjustment is made in the automatic frequency control loop which restores the standard phase condition, corresponding to zero output from the phase detector, the master and slave oscillators are at precisely the same frequency and, moreover, are in phase.

Suppose now that the phase shifter 17 is suddenly advanced $\epsilon$ degrees in phase. Momentarily, the inputs to the phase detector will deviate $\epsilon$ degrees from the standard condition and a control voltage, say $Ep$, is developed. The application of this voltage to the frequency control means shifts the slave oscillator frequency, and introduces a frequency difference, which may be regarded as a frequency error. As a result of this frequency error a phase departure of the master and slave oscillators from the standard condition begins to develop. The feedback loop including the frequency control means 19 should be poled in such a way that this phase change is in a direction to return the phase detector inputs to the standard condition, thus reducing the control voltage $Ep$. With the advance of time the voltage $Ep$ is reduced to zero and master and slave oscillators are again brought into frequency synchronism but with a change of $\epsilon$ in the phase difference between them. In this manner, a phase shift $\epsilon$ produced initially in the phase shifter 17 at the frequency $\Delta$, which may be a relatively low frequency, is reproduced as a phase shift $\epsilon$ between the master and slave oscillators, which may have a relatively high frequency.

From the arrangement of the system of Fig. 1, it is evident that only the phase shifter 17 is responsible for the phase shift introduced between the waves produced by the master and slave oscillators. The system therefore provides for the introduction of a specified phase shift between two high frequency waves with the same precision with which the phase shift could be introduced or measured at the most favorable lower frequency, using heterodyne techniques.

The accuracy of the introduced phase shift is dependent in part upon the phase detector, in part upon the automatic frequency control means, and in part upon other portions of the system. The phase detector is used as a null-balance device, always operating with the same value of phase difference between its inputs, therefore the exact shape of its input vs. output characteristic curve is unimportant. Frequency drifting of the beating oscillator causes no concern because its affects equally the $\Delta$-frequency outputs of both mixers. Only when the calibrated phase shifter is unduly frequency selective is the frequency stability of the beat oscillator of consequence. If necessary in a special case, an additional automatic frequency control system (not shown) can be arranged in conventional manner to maintain the beat oscillator at a fixed frequency difference from the frequency of the master oscillator, thus entirely removing frequency sensitivity of the phase shifter as a possible source of error.

Phase stability of the mixers is also a factor in maintaining high accuracy. The error from this source is small and is removed whenever the zero condition adjustment is made.

Drift of the master oscillator frequency or drift in the operating conditions in the automatic frequency control loop around the slave oscillator constitute further possible sources of error. The effect of these drifts is to introduce what may be termed a "strain" in the control loop and therefore a displacement of operating point on the phase detector characteristic. This operating point displacement results in a shift of high frequency phase. It is theoretically possible to reduce the error produced by these drifts to any desired degree by providing the loop with a sufficiently high product of phase detector sensitivity and sensitivity of the frequency altering means, such as a reactance tube for example. A state of zero error in the presence of drift would require this product to be infinite. While it is physically impossible to make the product infinite, it is possible to obtain substantially the equivalent effect by other means, as will be shown. If, at any time after the initial zero condition has been established, the meter 20 across the phase detector output indicates the presence of direct current (error current), a reactance adjustment may be made in the slave oscillator circuit to return this voltage to zero. This completely removes the strain in the loop and produces the effect of an infinite slope product, hence reducing the error to zero. The reactance adjustment may be made manually, as by turning a tuning element of the slave oscillator, or, if desired a servomechanism (not shown) may be employed to perform this operation automatically.

A numerical example drawn from a system that was successfully operated will serve to indicate the small magnitude of the error to be expected from drift. A phase detector sensitivity of 0.022 volt per degree was observed. A reactance tube was used that had a sensitivity of 175 kilocycles per second per volt of error signal. It follows from these data that a 3.85 kilocycle shift of master frequency would cause one degree of phase error. The master oscillator used had a frequency in the neighborhood of 20 megacycles and a frequency drift of considerably less than 100 cycles in an hour. The error resulting from this drift one hour after "zeroing" would therefore be 100/3850 or 0.026 degree, which is relatively insignificant in the majority of measurement applications.

The upper frequency limit at which the technique herein disclosed would appear applicable is determined by the ability to construct suitable mixers and frequency controllable oscillators. With the present state of the art, these elements may be constructed well into the microwave range. For practical purposes, therefore, the feasible frequency range of the invention as seen at present extends from kilocycles to kilomegacycles.

Fig. 2 shows a heterodyne system of phase shift measurement in which the mixers are operated at a constant frequency and at a substantially constant moderate amplitude conducive of minimum noise generation and freedom from overload.

In Fig. 2, the portion of the system that is included within the box 22 is substantially the system of Fig. 1. The utilization device for the master oscillator is represented by a block comprising a reference transmission path 23 exterior to the box 22. The utilization device for the slave oscillator is a transmission path 24 to be measured (for phase shift). The paths 23, 24 are each connected at the output end to a phase detector 25 similar to the phase detector 18. A meter 26 is provided at the output of the phase detector 25.

The circuit in the box 22, as in Fig. 1, supplies two waves of frequency, say $f$, differing in phase by an amount precisely controllable by a (low frequency) variable phase shifter. The system of Fig. 2 permits making phase determinations with high accuracy, without the necessity of translating the phase data to another frequency before making the actual phase comparison. The system avoids errors introduced by modulator noise and overload.

In the system of Fig. 2, the output of the master oscillator passes through the reference transmission path and the output of the slave oscillator passes through the transmission path to be measured. The phases of the outputs of these paths are compared, in the phase detector 25 and a null reading can be obtained in the meter 26 by adjusting the calibrated phase shifter 17. When a null reading is had, the phase shifter 17 indicates the difference in phase shift between paths 23 and 24. The system may be zeroed by means of the switch 21 as in Fig. 1, the switch in this case shorting out the transmission path to be measured.

While the system of Fig. 2 involves the use of mixers in the generation of the controllable phase shift at the frequency $f$, the significant difference is the particular placement of the mixers. They are located, not in the measurement path where they may introduce error, but in a portion of the circuit where their input levels are moderate and substantially constant. Noise and overload in the mixers therefore are not troublesome. Particularly where the unknown path to be measured has high loss or high gain there results a large difference in level between the mixer inputs in prior art systems, resulting in either excessive noise or overload. In the present system the two mixers operate at substantially the same, moderate input level, avoiding this difficulty.

Another source of error in heterodyne measurement technique that is avoided in the system of Fig. 2 is pick-up of energy from the beating oscillator at the mixer by stray paths other than the intended connection between the beating oscillator and the mixer. This pick-up ordinarily results in spurious modulation products in the mixer or its associated amplifying stages. The end result is a spurious wave in the phase comparison circuit. Elimination of the mixers from the measurement path removes this source of error. Pick-up at the mixer inputs in the system of Fig. 2 causes no significant error because the levels at the mixer inputs are substantially constant. While the mixing or modulation process is not eliminated from the system, the function is shifted to a portion of the system where it does not introduce the usual errors.

The invention is not limited to the precise embodiments, shown, and numerous variations will readily be made by those skilled in the art without departing from the spirit and scope of the invention.

What is claimed is:

1. A system for measuring the phase shift occurring in a signal while traversing a first transmission path comprising two wave sources nominally of equal frequency, one of said sources being controllable as to frequency independently of the other, two mixers having one input of each connected respectively to the outputs of said wave sources, a beating oscillator having its output connected to the remaining inputs of said mixers, a phase shifter connected to the output of one of said mixers, a phase detector having its inputs connected respectively to the output of said phase shifter and the output of the remaining one of said mixers, control means connected between said phase detector and said controllable source whereby the frequency and phase differences that may exist between the input signals of said phase detector are reduced, a reference transmission path connected to the output of one of said sources, means connecting said first transmission path to the output of the remaining one of said sources, a second phase detector having its inputs connected respectively to the outputs of said transmission paths, indicating means connected to the output of said second phase detector, and switching means connected in parallel with said first transmission path whereby said switching means may be used to short-out said first transmission path.

2. A system for introducing a phase difference between waves supplied by two sources nominally of equal frequency, one of said sources being controllable as to frequency independently of the other, said system comprising a beating oscillator, first and second mixers each connected to both said beating oscillator and respective ones of said sources for producing output waves having frequencies equal to the difference between the frequency of said oscillator and the frequencies of said respective ones of said sources, a phase shifter connected to the output of said first mixer and adapted for shifting the phase of said first mixer difference frequency output wave with respect to the phase of said second mixer difference frequency output wave, phase comparing means connected to both the output of said second mixer and said phase shifter for comparing the phases of said second mixer difference frequency output wave and the output wave from said phase shifter and means for controlling the frequency of said controllable source in response to the output of said phase comparing means whereby the phase difference between the waves supplied by said sources is determined in amount by said phase shifter.

References Cited in the file of this patent

UNITED STATES PATENTS

| | | |
|---|---|---|
| 1,731,264 | Potter | Oct. 15, 1929 |
| 1,931,873 | Marrison | Oct. 24, 1933 |
| 2,018,820 | Usselman | Oct. 29, 1935 |
| 2,104,801 | Hansell | Jan. 11, 1938 |
| 2,479,817 | Curran | Aug. 23, 1949 |
| 2,541,454 | White et al. | Feb. 13, 1951 |
| 2,580,803 | Logan | Jan. 1, 1952 |
| 2,628,266 | Schroeder | Feb. 10, 1953 |